United States Patent
Uenohara

(10) Patent No.: US 9,157,490 B2
(45) Date of Patent: Oct. 13, 2015

(54) CLUTCH DEVICE

(75) Inventor: Norihisa Uenohara, Ibaraski (JP)

(73) Assignee: EXEDY Corporation, Osaka (JP)

( * ) Notice: Subject to any disclaimer, the term of this patent is extended or adjusted under 35 U.S.C. 154(b) by 509 days.

(21) Appl. No.: 13/634,457

(22) PCT Filed: Mar. 23, 2011

(86) PCT No.: PCT/JP2011/056897
§ 371 (c)(1),
(2), (4) Date: Sep. 12, 2012

(87) PCT Pub. No.: WO2011/125493
PCT Pub. Date: Oct. 13, 2011

(65) Prior Publication Data
US 2013/0001035 A1    Jan. 3, 2013

(30) Foreign Application Priority Data

Apr. 7, 2010   (JP) ................................. 2010-088743

(51) Int. Cl.
*F16D 13/75*        (2006.01)
*F16D 21/06*        (2006.01)

(52) U.S. Cl.
CPC .............. *F16D 13/757* (2013.01); *F16D 21/06* (2013.01); *F16D 2021/0684* (2013.01); *F16D 2021/0692* (2013.01)

(58) Field of Classification Search
CPC ............ F16D 13/757; F16D 2013/703; F16D 2013/706; F16D 21/06; F16D 2021/0692; F16D 2021/0684; F16D 13/75
See application file for complete search history.

(56) References Cited

U.S. PATENT DOCUMENTS

| 4,210,232 A | * | 7/1980 | Beccaris ...................... 192/48.8 |
| 4,640,400 A | * | 2/1987 | Nakane et al. ........... 192/70.252 |
| 6,079,537 A | | 6/2000 | Hofmann et al. |
| 2004/0238307 A1 | | 12/2004 | Vogt et al. |

FOREIGN PATENT DOCUMENTS

| DE | 10155458 A1 | 5/2002 |
| DE | 602005002801 T2 | 7/2008 |
| JP | 47-7014 A | 4/1972 |
| JP | 11-325114 A | 11/1999 |
| JP | 2000-18274 A | 1/2000 |

(Continued)

OTHER PUBLICATIONS

Chinese Office Action of the corresponding Chinese Patent Application No. 201180017615.X, dated May 19, 2014.

(Continued)

*Primary Examiner* — Huan Le
(74) *Attorney, Agent, or Firm* — Global IP Counselors, LLP

(57) ABSTRACT

A clutch device includes an input rotor, a first pressure plate, a second pressure plate, a first clutch disc assembly, a second clutch disc assembly, a first diaphragm spring, a second diaphragm spring, a first adjusting bolt, a first adjusting spring and a first slide bushing. The first adjusting bolt is configured to be axially moved with respect to the first pressure plate when rotated with respect to the first pressure plate. The first adjusting spring is configured to apply rotational force to the first adjusting bolt. The first slide bushing is disposed while being allowed to restrict the first pressure plate from moving towards the first clutch disc assembly.

27 Claims, 11 Drawing Sheets

(56) References Cited

FOREIGN PATENT DOCUMENTS

| | | |
|---|---|---|
| JP | 2002-174262 A | 6/2002 |
| JP | 2006-64078 A | 3/2006 |
| JP | 2006-132664 A | 5/2006 |

OTHER PUBLICATIONS

Office Action of the corresponding German Patent Application No. 11 2011 101 258.6, dated Apr. 10, 2015.

* cited by examiner

CLUTCH DEVICE

CROSS-REFERENCE TO THE RELATED APPLICATIONS

This U.S. national phase application claims priority to Japanese Patent Application No. 2011-088743 filed on Apr. 7, 2010. The entire disclosure of Japanese Patent Application No. 2011-088743 is hereby incorporated herein by reference.

TECHNICAL FIELD

The present invention relates to a clutch device for transmitting power from an engine to a transmission.

BACKGROUND ART

Automatic transmissions (ATs) have been known as means for automatically shifting gears of vehicles. In recent years, a mainstream type of the ATs has a combinational structure of, for instance, a torque converter, a plurality of planet gears and a plurality of clutches. Such a type of AT does not require an operator to perform clutch operations, normally required in manual transmissions (MTs), in starting moving a vehicle, stopping a vehicle and shifting gears due to a continuous gear shifting action by the torque converter and an automatic switching among the plural clutches.

However, torque converters are configured to transmit power through fluid. Therefore, the power transmission efficiency of the ATs is lower than that of the MTs configured to mechanically couple the input side and the output side directly in transmitting torque. Therefore, the ATs have a drawback of degrading fuel consumption of the vehicles although having an advantage of reducing operators' effort.

In view of the above, automated manual transmissions (AMTs), structured based on the MTs, have been proposed for reliably achieving the transmission efficiency of the MTs, and simultaneously, eliminating the need of clutch operations. In the AMTs, the clutch operations of the MTs and the gear-shifting operations of the transmissions are automated. Therefore, the AMTs can reliably achieve a transmission efficiency equivalent to that of the well-known MTs, and simultaneously, eliminate the need of clutch operations.

However, the AMTs are configured to decouple the clutches in performing a gear-shifting operation similarly to the MTs and torque transmission is thereby temporarily prevented. Vehicles travel only by means of inertia force without accelerating while torque transmission is prevented. Such torque transmission prevention greatly affects the acceleration performance of vehicles and tends to make operators feel uncomfortable.

In view of the above, AMTs employing a twin clutch device have been proposed for solving the drawback of the torque transmission prevention (see e.g., PTL 1).

CITATION LIST

Patent Literature

PTL 1: Japan Laid-open Patent Application Publication No. JP-A-2002-174262

SUMMARY

Technical Problems

In consideration of abrasion of a clutch disc, wet clutch devices have been proposed as clutch devices of the aforementioned type.

However, the wet clutch devices are required to implement a seal structure and are therefore complicatedly structured.

In view of this, dry clutch devices have been proposed.

The dry clutch devices can be more simplify structured than the wet clutches. However, performance of the dry clutch devices may vary due to clutch disc abrasion.

It is an object of the present invention to provide a clutch device for inhibiting performance variation attributed to abrasion.

Solution to Problems

A clutch device according to the present invention is a device for transmitting power from an engine to a first input shaft and a second input shaft of a transmission. The clutch device includes an input rotor, a first pressure plate, a second pressure plate, a first clutch disc assembly, a second clutch disc assembly, a first drive member, a second drive member, a first adjusting member, a first elastic member and a first detecting member. The input rotor receives power transmitted thereto from the engine. The first pressure plate is disposed while being axially movable and unitarily rotatable with the input rotor. The second pressure plate is disposed while being axially movable and unitarily rotatable with the input rotor. The first clutch disc assembly is allowed to be coupled to the first input shaft while being disposed between the input rotor and the first pressure plate. The second clutch disc assembly is allowed to be coupled to the second input shaft while being disposed between the input rotor and the second pressure plate. The first drive member is disposed while being allowed to axially press the first pressure plate. The second drive member is disposed while being allowed to axially press the second pressure plate. The first adjusting member is disposed for transmitting pressing force of the first drive member to the first pressure plate. The first adjusting member is configured to be axially moved with respect to the first pressure plate when rotated with respect to the first pressure plate. The first elastic member is configured to apply rotational force to the first adjusting member. The first detecting member is supported by the first pressure plate while being axially movable with respect to the first pressure plate in accordance with abrasion of the first clutch disc assembly. The first detecting member is disposed while being allowed to restrict the first pressure plate from moving towards the second clutch disc assembly.

According to the present clutch device, it is possible to inhibit performance variation attributed to abrasion.

DETAILED DESCRIPTION OF THE PREFERRED EMBODIMENTS

<Entire Structure of Clutch Device>

Figure 1:
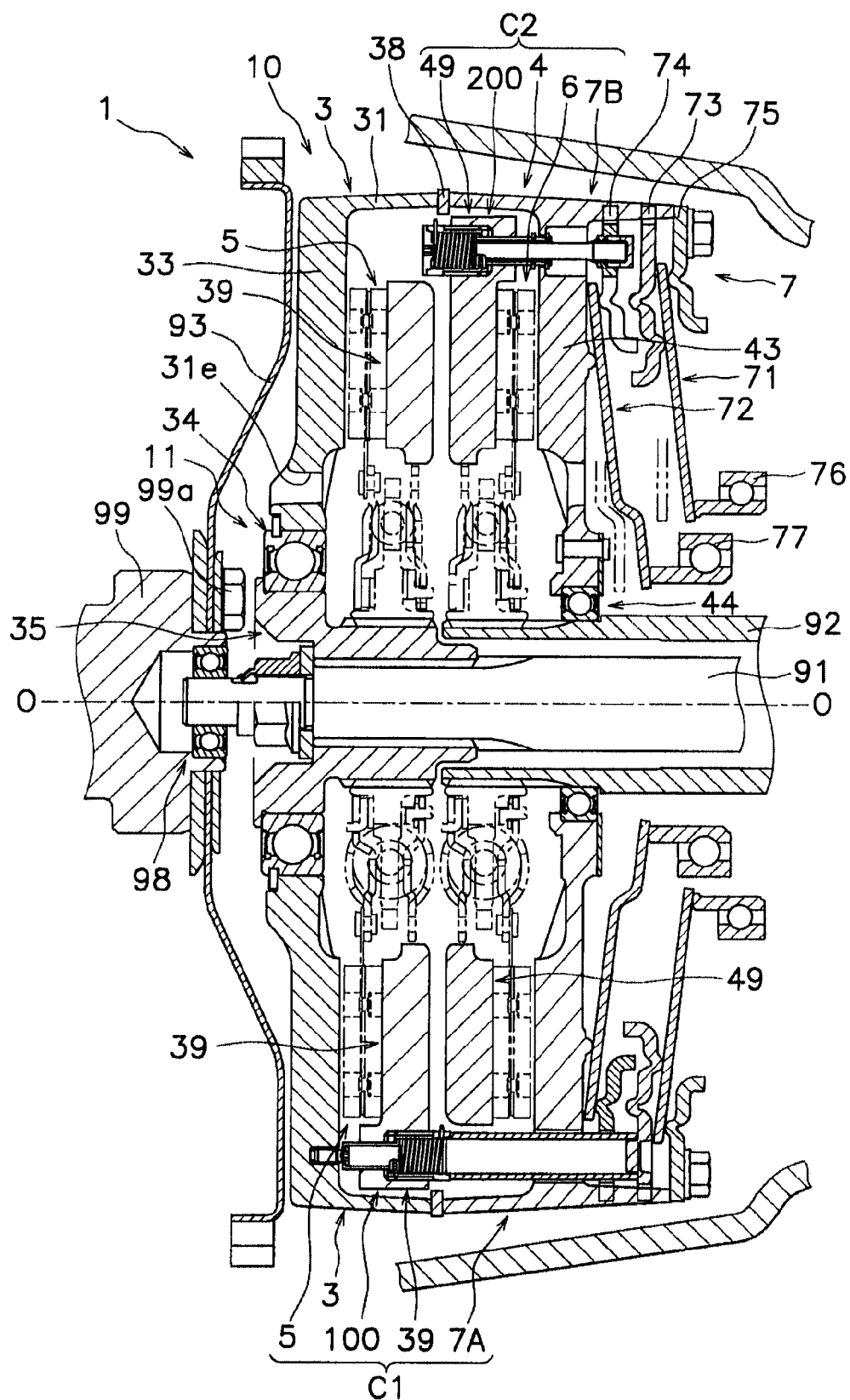
FIG. 1 is a cross-sectional view of a clutch device.
Figure 2:
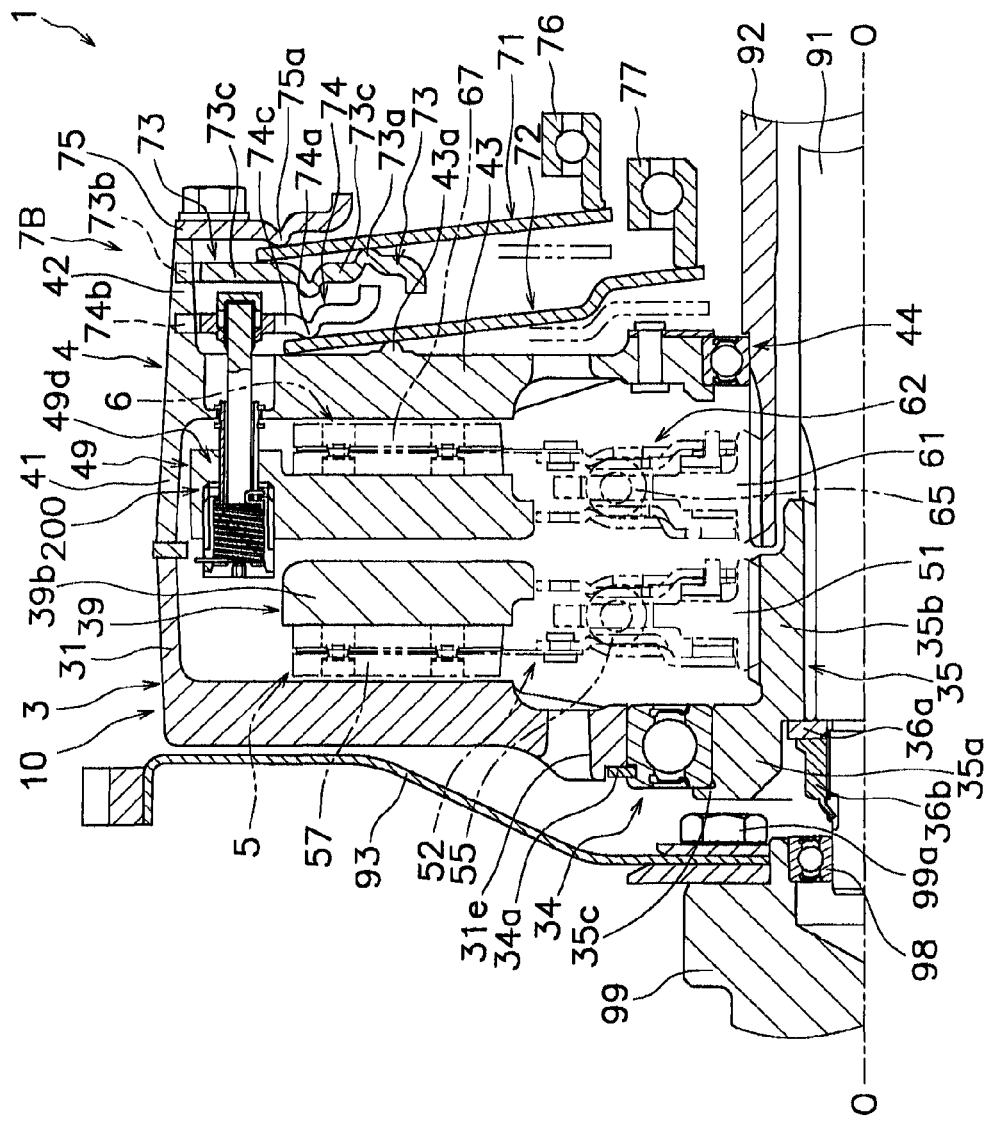
FIG. 2 is a cross-sectional view of the clutch device (the upper half of FIG. 1).
Figure 3:
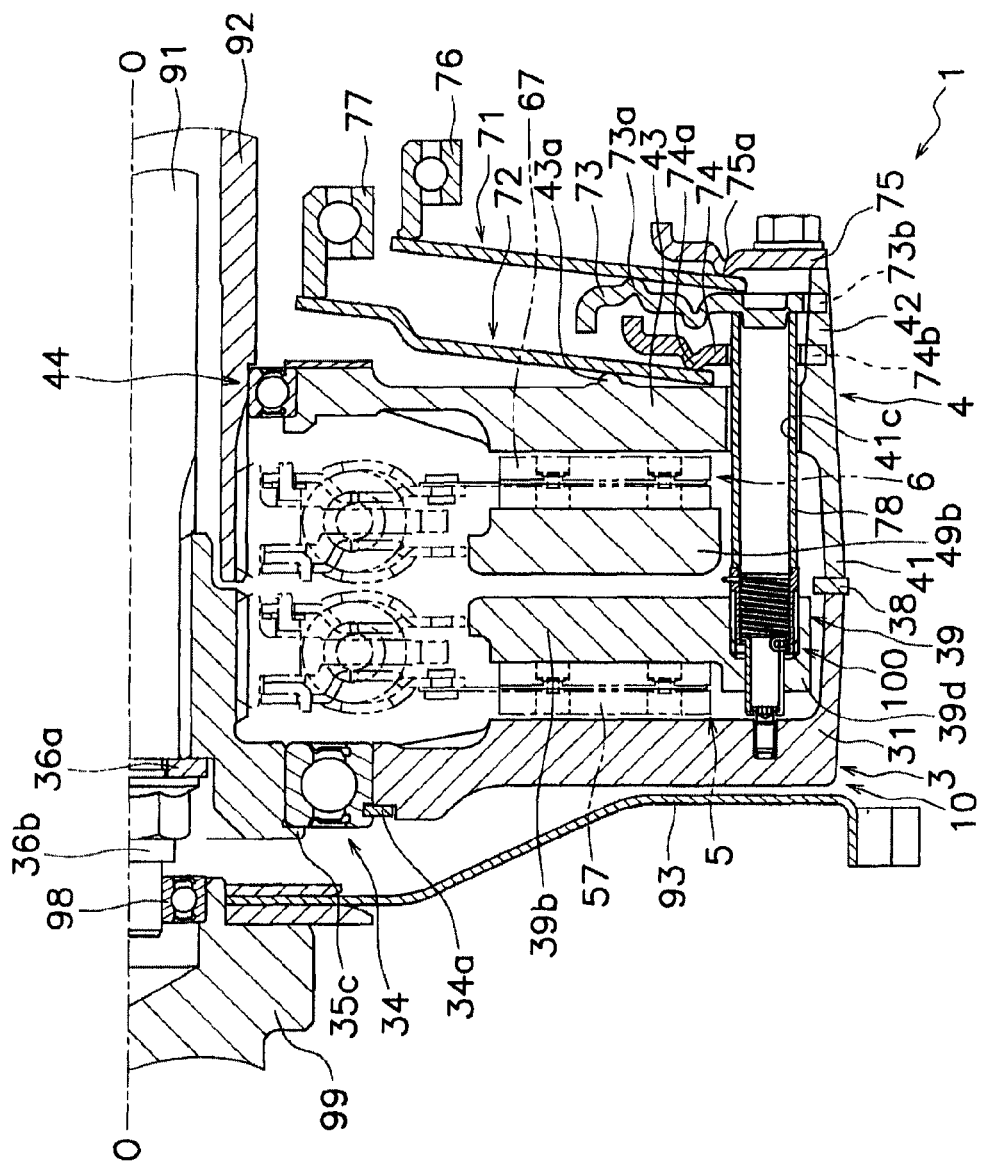
FIG. 3 is a cross-sectional view of the clutch device (the lower half of FIG. 1).

As illustrated in FIGS. 1 to 3, a clutch device 1 is a device for transmitting power from an engine to a first input shaft 91 and a second input shaft 92 of a transmission. The clutch device 1 includes an input rotor 10, a first pressure plate 39, a second pressure plate 49, a first clutch disc assembly 5, a second clutch disc assembly 6, a drive mechanism 7, a plurality of first abrasion tracking mechanisms 100 and a plurality of second abrasion tracking mechanisms 200. A first clutch C1 is formed by the input rotor 10, the first pressure plate 39, the first clutch disc assembly 5 and a first drive mechanism 7A of the drive mechanism 7. A second clutch C2 is formed by the input rotor 10, the second pressure plate 49, the second clutch disc assembly 6 and a second drive mechanism 7B of the drive mechanism 7. Both of the first clutch C1 and the second clutch C2 are so-called normal open type clutches. The first clutch C1 is configured to transmit power at first, third and fifth speed stages, whereas the second clutch C2 is configured to transmit power at second and fourth speed stages.

<Input Rotor 10>

As illustrated in FIGS. 1 to 3, the input rotor 10 is a member receiving power transmitted from the engine. The input rotor 10 is coupled to a crankshaft 99 through a flexible plate 93. The inner peripheral part of the flexible plate 93 is fixed to the crankshaft 99 by means of at least a bolt 99a, while the outer peripheral part thereof is fixed to the input rotor 10 by means of at least a bolt (not illustrated in the figures). A bearing 98 is fixed into an end of the crankshaft 99. The tip of the first input shaft 91 is rotatably supported by the bearing 98.

The input rotor 10 mainly includes a first flywheel 3, a second flywheel 4 and an intermediate plate 38.

(1) First Flywheel 3

As illustrated in FIGS. 1 to 3, the first flywheel 3 includes an annular first disc portion 33, a plurality of first fixation portions 31 and a plurality of first vent holes 31e. The first fixation portions 31 are circular-arc portions protruded from the outer peripheral part of the first disc portion 33 towards the second flywheel 4. The first fixation portions 31 are aligned at equal pitches in the circumferential direction.

(2) Second Flywheel 4

As illustrated in FIGS. 1 to 3, the second flywheel 4 includes a second disc portion 43, a plurality of second fixation portions 41, a plurality of protruding portions 42, a plurality of first through holes 41c and a plurality of second through holes 41d.

Figure 4:
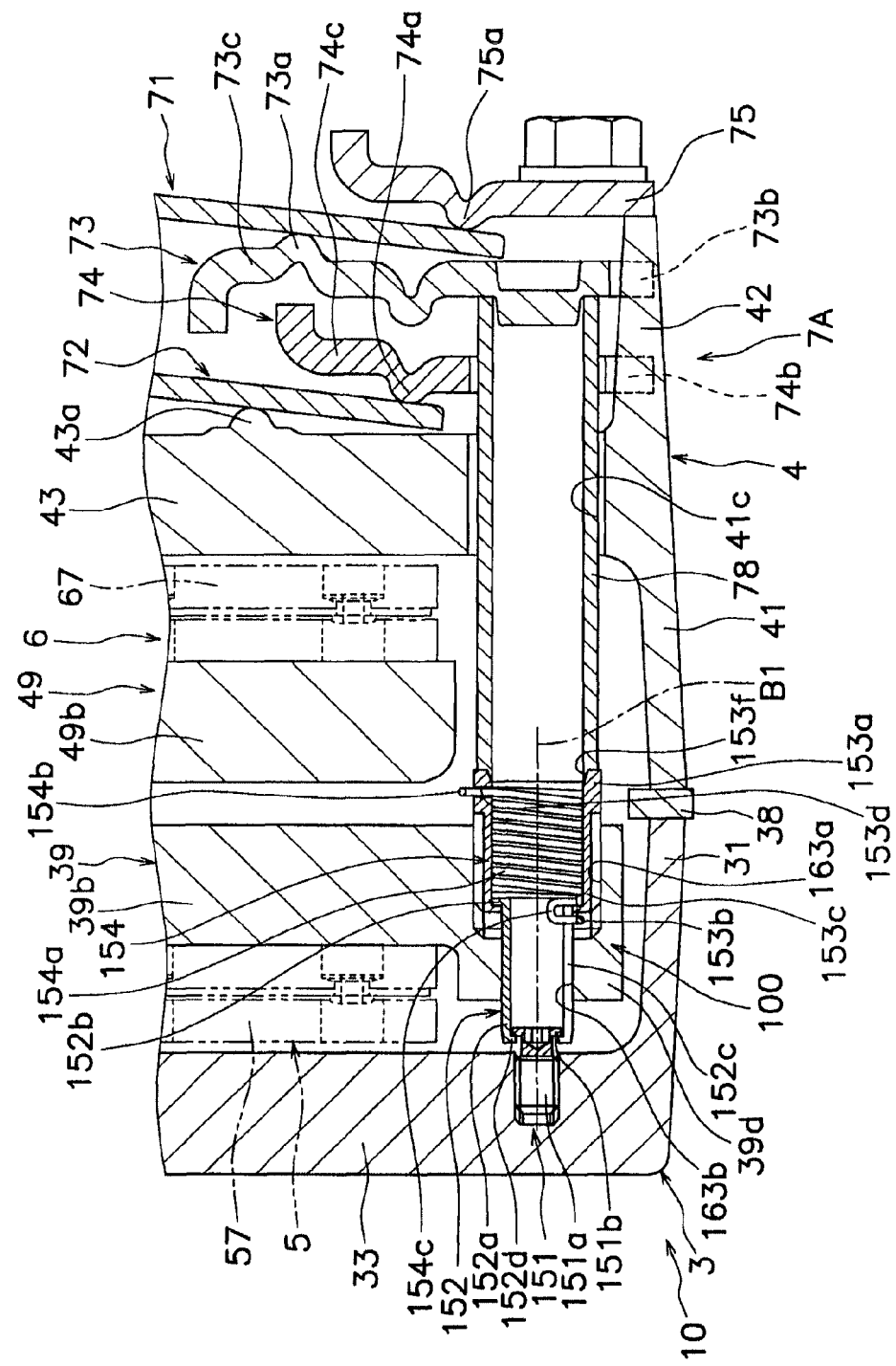
FIG. 4 is a partial cross-sectional view of a first abrasion tracking mechanism and its periphery.
Figure 6:
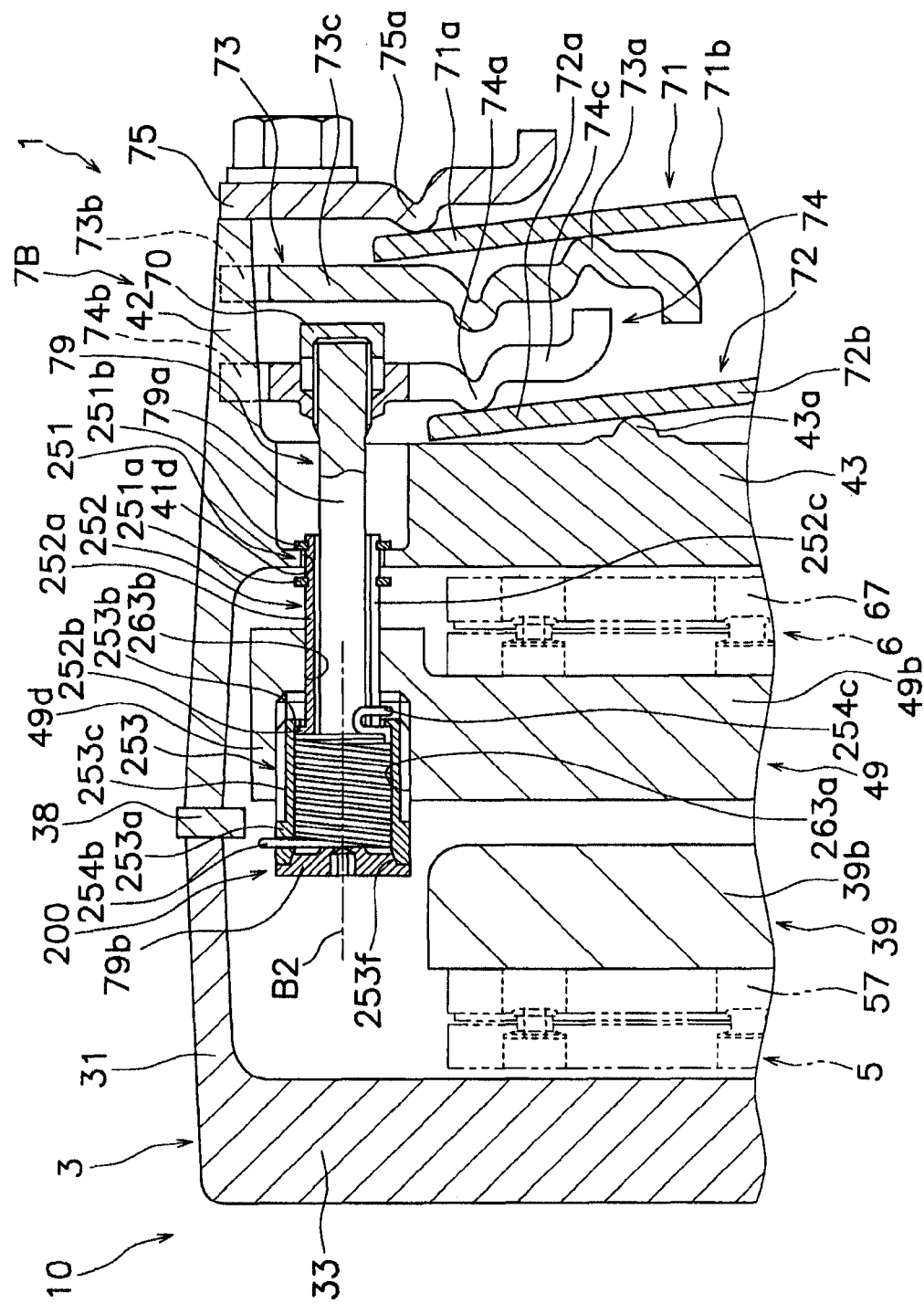
FIG. 6 is a partial cross-sectional view of a second abrasion tracking mechanism and its periphery.

The second disc portion 43 is disposed away from the first disc portion 33 in the axial direction. The second fixation portions 41 are circular-arc portions protruded from the outer peripheral part of the second disc portion 43 towards the first flywheel 3. The second fixation portions 41 are aligned at equal pitches in the circumferential direction. The protruding portions 42 are disposed on the second fixation portions 41 while being aligned at equal pitches in the circumferential direction. The protruding portions 42 are protruded from the outer peripheral part of the second disc portion 43 towards the transmission (i.e., to the opposite side of the first flywheel 3). Further, the second disc portion 43 includes a support protruding portion 43a protruded towards the transmission. The support protruding portion 43a makes contact with a second diaphragm spring 72. As illustrated in FIG. 4, an intermediate member 78 is inserted into each first through hole 41c. As illustrated in FIG. 6, a second slide bushing 252 is inserted into each second through hole 41d.

(3) Intermediate Plate 38

As illustrated in FIGS. 1 to 3, the intermediate plate 38 is unitarily rotatable with the first flywheel 3 and the second flywheel 4 while being interposed between the first flywheel 3 and the second flywheel 4. First strap plates (not illustrated in the figures) and second strap plates (not illustrated in the figures) are fixed to the intermediate plate 38. The first strap plates axially elastically couple the first pressure plate 39 to the intermediate plate 38 for allowing the first pressure plate 39 to be unitarily rotated with the intermediate plate 38. The second strap plates axially elastically couple the second pressure plate 49 to the intermediate plate 38 for allowing the second pressure plate 49 to be unitarily rotated with the intermediate plate 38. The first strap plates keep the first pressure plate 39 in the position illustrated in FIGS. 1 to 3. The second strap plates keep the second pressure plate 49 in the position illustrated in FIGS. 1 to 3.

<Rotation Support Mechanism 11>

A rotation support mechanism 11 is disposed between the first input shaft 91 and the input rotor 10 while being disposed between the second input shaft 92 and the input rotor 10. The rotation support mechanism 11 supports the input rotor 10 in a rotatable state with respect to the first and second input shafts 91 and 92.

Specifically, as illustrated in FIGS. 1 to 3, the rotation support mechanism 11 includes a first bearing 34, a second bearing 44 and a support member 35. The first bearing 34 is disposed between the first disc portion 33 and the first input shaft 91. The first bearing 34 supports the first disc portion 33 in a rotatable state with respect to the first input shaft 91. The first bearing 34 is disposed between the support member 35 and the first disc portion 33. The first bearing 34 is restricted from axially moving with respect to the first disc portion 33 by a snap ring 34a.

The second bearing 44 is disposed between the second disc portion 43 and the second input shaft 92. The second bearing 44 supports the second disc portion 43 in a rotatable state with respect to the second input shaft 92. The second bearing 44 is restricted from moving towards the transmission by the second input shaft 92.

The support member 35 is attached onto the first input shaft 91 and supports the first flywheel 3 and the first clutch disc assembly 5. The support member 35 includes a first cylindrical portion 35b, a second cylindrical portion 35a formed on an end of the first cylindrical portion 35b and a positioning portion 35c. The first cylindrical portion 35b is fitted onto a spline of the first input shaft 91. The first cylindrical portion 35b includes a spline formed on the outer periphery thereof. The first cylindrical portion 35b is fitted into a first hub 51 of the first clutch disc assembly 5. The first cylindrical portion 35b is restricted from moving towards the engine with respect to the first input shaft 91 by a ring 36a and a fixation member 36b. The outer diameter of the first cylindrical portion 35b is roughly the same as that of the second input shaft 92. Therefore, it is possible to use the first hub 51 and a second hub 61 as compatible components.

The second cylindrical portion 35a is fitted into the inner peripheral side of the first bearing 34. The outer diameter of the second cylindrical portion 35a is greater than that of the first cylindrical portion 35b. The inner diameter of the second cylindrical portion 35a is greater than that of the first cylindrical portion 35b. The ring 36a and the fixation member 36b are disposed on the inner peripheral side of the second cylindrical portion 35a.

The positioning portion 35c is an annular portion protruded radially outwards from the second cylindrical portion 35a. The positioning portion 35c is disposed on the engine-side edge of the second cylindrical portion 35a. The first bearing 34 is axially positioned by the second cylindrical portion 35a.

<First Pressure Plate 39>

As illustrated in FIGS. 1 to 3, the first pressure plate 39 is disposed within the input rotor 10 while being unitarily rotatable with and axially movable with respect to the first disc portion 33. Specifically, the first pressure plate 39 includes a first main body 39b having a roughly disc shape and a plurality of first support portions 39d.

The first main body 39b is disposed while being axially opposed to the first disc portion 33. The plural first support portions 39d are protruded radially outwards from the first main body 39b while being circumferentially aligned at equal pitches. Each first support portion 39d includes a first support hole 163b and a first screw hole 163a, and each first abrasion tracking mechanism 100 is disposed therein.

<Second Pressure Plate 49>

As illustrated in FIGS. 1 to 3, the second pressure plate 49 is disposed within the input rotor 10 while being unitarily rotatable with and axially movable with respect to the second disc portion 43. Specifically, the second pressure plate 49 includes a second main body 49b having a roughly disc shape and a plurality of second support portions 49d.

The second main body 49b is disposed while being axially opposed to the second disc portion 43. The plural second support portions 49d are protruded radially outwards from the second disc portion 43 while being circumferentially aligned at equal pitches. Each second support portion 49d includes a second support hole 263b and a second screw hole 263a, and each second abrasion tracking mechanism 200 is disposed therein.

<First Clutch Disc Assembly 5>

As illustrated in FIGS. 1 to 3, the first clutch disc assembly 5 is an assembly for transmitting power from the input rotor 10 to the first input shaft 91. The first clutch disc assembly 5 is coupled to the first input shaft 91 through the support member 35. The first clutch disc assembly 5 includes a first friction part 57, a first input member 52, the first hub 51 and a plurality of first springs 55.

The first friction part 57 is disposed axially between the first disc portion 33 and the first pressure plate 39. The first friction part 57 is disposed slidably with the input rotor 10 and the first pressure plate 39. The first input member 52 is a member to which power is transmitted from the first friction part 57. The first input member 52 is coupled to the first friction part 57. The first hub 51 is coupled to the first input shaft 91 through the support member 35. The first springs 55 are supported by the first input member 52 while being elastically deformable. The first springs 55 elastically couple the first input member 52 and the first hub 51 in the rotational direction.

<Second Clutch Disc Assembly 6>

As illustrated in FIGS. 1 to 3, the second clutch disc assembly 6 is an assembly for transmitting power from the input rotor 10 to the second input shaft 92 and is coupled to the second input shaft 92. The second clutch disc assembly 6 includes a second friction part 67, a second input member 62, the second hub 61 and a plurality of second springs 65.

The second friction part 67 is disposed axially between the second disc portion 43 and the second pressure plate 49. The second friction part 67 is disposed slidably with the input rotor 10 and the second pressure plate 49. The second input member 62 is a member to which power is transmitted from the second friction part 67. The second input member 62 is coupled to the second friction part 67. The second hub 61 is coupled to the second input shaft 92. The second springs 65 are supported by the second input member 62 while being elastically deformable. The second springs 65 elastically couple the second input member 62 and the second hub 61 in the rotational direction.

<Drive Mechanism 7>

(1) First Drive Mechanism 7A

The first drive mechanism 7A is a mechanism for operating power transmission of the first clutch C1. The first drive mechanism 7A is configured to transmit axial pressing force to the first pressure plate 39. As illustrated in FIGS. 1 to 3, the first drive mechanism 7A includes a first diaphragm spring 71, a first support plate 75 having an annular shape, a second support plate 73 having an annular shape and the plural intermediate members 78.

The first diaphragm spring 71 includes a first coupling portion 71a having an annular shape and a plurality of first lever portions 71b. The first lever portions 71b are extended radially inwards from the first coupling portion 71a while being circumferentially aligned at predetermined intervals.

The first support plate 75 is fixed to the protruding portions 42. The first support plate 75 includes a first protrusion 75a. The first protrusion 75a makes contact with the outer peripheral part of the first diaphragm spring 71. The second support plate 73 includes a second main body 73c having an annular shape, a protruding portion 73a protruded towards the transmission and a plurality of second drive protruding portions 73b protruded radially outwards from the second main body 73c. The intermediate members 78 are fixed to the second drive protruding portion 73b on a one-to-one basis. Each second drive protruding portion 73b is disposed between adjacent two of the protruding portions 42. The second support plate 73 is supported by the second fixation portions 41 while being unitarily rotatable with and axially movable with respect to the second flywheel 4.

(2) Second Drive Mechanism 7B

The second drive mechanism 7B is a mechanism for operating power transmission of the second clutch C2. The second drive mechanism 7B is configured to transmit axial pressing force to the second pressure plate 49. As illustrated in FIG. 3, the second drive mechanism 7B includes the second diaphragm spring 72 (an exemplary second drive member), a third support plate 74 having an annular shape, a plurality of coupling rods 79 and a plurality of fixation members 70.

The second diaphragm spring 72 includes a second coupling portion 72a having an annular shape and a plurality of second lever portions 72b. The second lever portions 72b are radially extended from the second coupling portion 72a while being circumferentially aligned at predetermined intervals.

The third support plate 74 includes a third main body 74c having an annular shape, a third protruding portion 74a protruded towards the engine and a plurality of third drive protruding portions 74b protruded radially outwards from the third main body 74c. Each third drive protruding portion 74b is disposed between adjacent two of the protruding portions 42. The third support plate 74 is supported by the second fixation portions 41 while being unitarily rotatable with and axially movable with respect to the second flywheel 4.

The coupling rods 79 are disposed for transmitting pressing load to the second pressure plate 49. Each coupling rod 79 includes a rod portion 79a and a cap portion 79b. An end of the rod portion 79a is fixed to the third support plate 74 by the fixation member 70. The cap portion 79b is disposed on the engine-side end of the rod portion 79a.

<First Abrasion Tracking Mechanisms 100>

Figure 5:
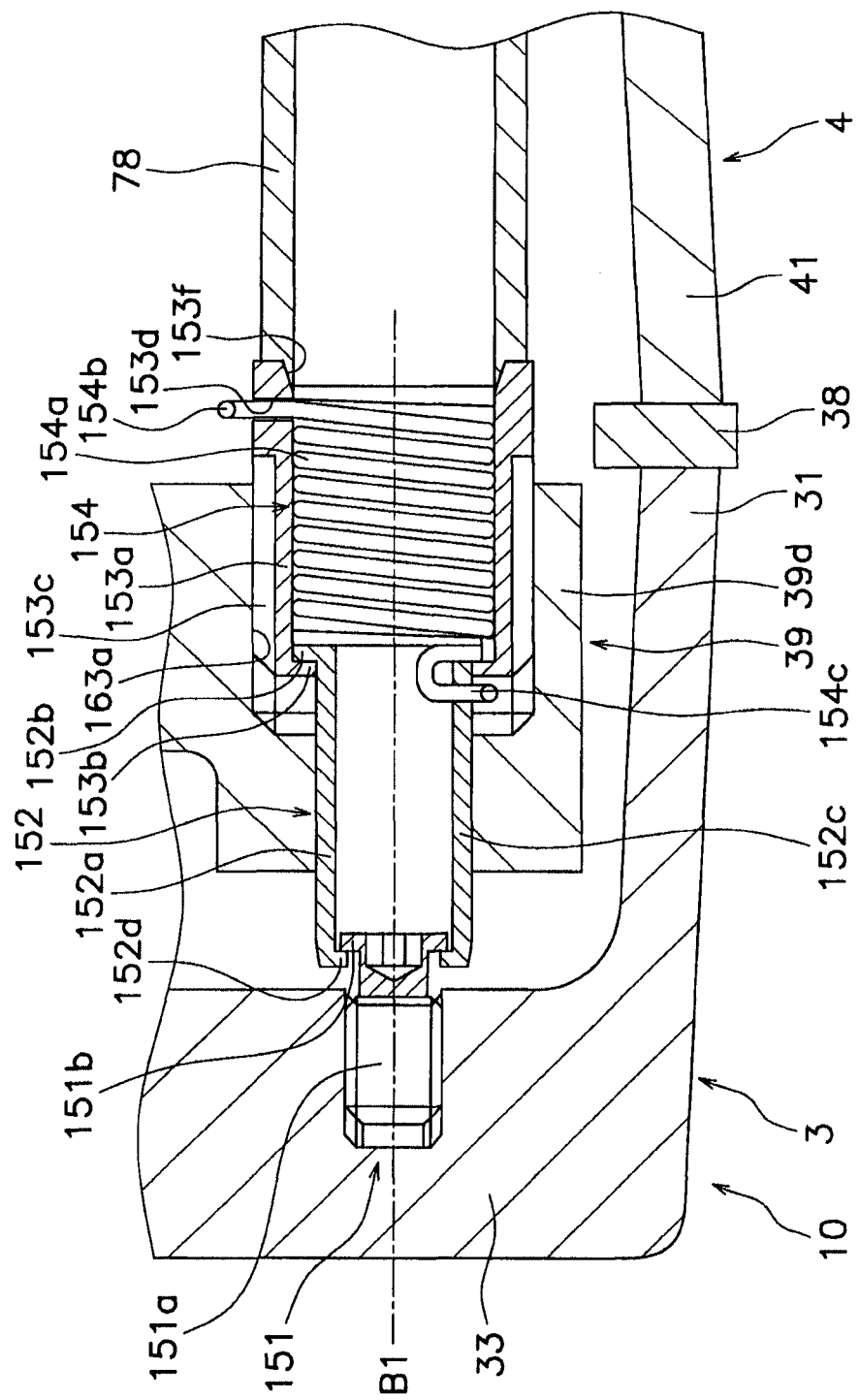
FIG. 5 is an enlarged cross-sectional view of the first abrasion tracking mechanism and its periphery.

The plural first abrasion tracking mechanisms 100 are mechanisms circumferentially aligned at equal intervals for inhibiting performance degradation of the clutch device 1 attributed to abrasion of the first friction part 57 of the first clutch C1. As illustrated in FIGS. 4 and 5, each first abrasion tracking mechanism 100 specifically includes a first adjusting bolt 153 (an exemplary first or second adjusting member), a first adjusting spring 154 (an exemplary first or second elastic member), a first slide bushing 152 (an exemplary first or second detecting member) and a first stopper 151 (an exemplary first or second stopper part).

The first adjusting bolt 153 is attached to the first pressure plate 39 while being disposed for transmitting pressing force of the first diaphragm spring 71 to the first pressure plate 39. Specifically, the first adjusting bolt 153 includes a first bolt main body 153a and a first contact portion 153b. The first bolt main body 153a, having a roughly tubular shape, includes a first screw portion 153c. The first contact portion 153b, having an annular shape, is protruded radially inwards from the first bolt main body 153a.

The first bolt main body 153a is screwed into the first screw hole 163a. Therefore, the first bolt main body 153a is configured to be axially moved with respect to the first pressure plate 39 when being rotated with respect to the first pressure plate 39. The first adjusting spring 154 always applies rotational force to the first bolt main body 153a. More specifically, the first adjusting spring 154 applies rotational force to the first adjusting bolt 153 for allowing the first adjusting bolt 153 to be moved towards the transmission with respect to the first pressure plate 39.

Further, the end of the intermediate member 78 is inserted into the first bolt main body 153a. The first bolt main body 153a has a first tapered surface 153f. The first tapered surface 153f makes contact with the end of the intermediate member 78.

The first contact portion 153b is a portion having an annular shape and axially makes contact with a first restricting portion 152b (to be described) of the first slide bushing 152. The first slide bushing 152 is inserted into the first contact portion 153b.

The first slide bushing 152 is a member for restricting the first adjusting bolt 153 from moving towards the engine. The first slide bushing 152 is supported by the first pressure plate 39 while being axially movable with respect to the first pressure plate 39. The first slide bushing 152 is protruded towards the engine from the first pressure plate 39. The transmission-side end of the first slide bushing 152 is inserted into the first bolt main body 153a of the first adjusting bolt 153. The first slide bushing 152 is disposed concentrically to the first adjusting bolt 153.

The first slide bushing 152 includes a first slide bushing main body 152a having a roughly tubular shape, the first restricting portion 152b protruded radially outwards from the first slide bushing main body 152a in a roughly annular shape, and a first hooking portion 152d. The first slide bushing main body 152a is inserted into the first support hole 163b while the outer diameter thereof is reduced. Specifically, the first slide bushing main body 152a includes a first slit 152c having an axially elongated shape. The first slide bushing main body 152a is elastically deformable in the radial direction due to the first slit 152 formed therein. The first slide bushing main body 152a is tightly fitted into the first support hole 163b of the first pressure plate 39. Therefore, relatively large slide resistance is generated between the first slide bushing 152 and the first pressure plate 39 when the first slide bushing 152 is either rotated or axially moved with respect to the first pressure plate 39. Because of this, the first slide bushing 152 is basically moved unitarily with the first pressure plate 39 in the axial direction. When relatively large axial force acts on the first slide bushing 152, however, the first slide bushing 152 is axially moved with respect to the first pressure plate 39.

The first restricting portion 152b is disposed inside the first bolt main body 153a, while being disposed on the transmission side of the first contact portion 153b. The first restricting portion 152b axially makes contact with the first contact portion 153b. The first slit 152c is extended to the first restricting portion 152b. Therefore, the first restricting portion 152b is formed in a C-shape. A second end 154c (to be described) of the first adjusting spring 154 is inserted into the first slit 152c.

The first hooking portion 152d is formed in the first disc portion 33 side end of the first slide bushing 152. The first hooking portion 152d is a roughly annular portion protruded radially inwards from the first slide bushing main body 152a. The first hooking portion 152d is disposed for making contact with a stopper portion 151b of the first stopper 151. The first stopper 151 is inserted into the first hooking portion 152d.

The first adjusting spring 154 is a torsion coil spring for applying rotational force to the first adjusting bolt 153. The first adjusting spring 154 applies rotational force to the first adjusting bolt 153 for allowing the first adjusting bolt 153 to be moved towards the transmission with respect to the first pressure plate 39.

Specifically, the first adjusting spring 154 has a first spring main body 154a, a first end 154b and the second end 154c. The first spring main body 154a is a portion for generating rotational force and is disposed in the inner peripheral side of the first adjusting bolt 153. The first end 154b is protruded from the transmission-side end of the first spring main body 154a while being hooked on the first adjusting bolt 153. For example, the first end 154b is inserted into a first hooking hole 153d of the first adjusting bolt 153. The second end 154c is protruded from the first slide bushing 152 side end of the first spring main body 154a while being hooked on the first slide bushing 152. For example, the second end 154c is inserted into the first slit 152c of the first slide bushing 152. The first slide bushing 152 is tightly fitted into the first support hole 163b. Therefore, relatively large slide resistance is generated between the first slide bushing 152 and the first pressure plate 39 when the first slide bushing 152 is either rotated or axially moved with respect to the first pressure plate 39. Rotational force, applied to the first adjusting bolt 153 from the first adjusting spring 154, is not large enough to rotate the first slide bushing 152. Therefore, the first slide bushing 152 can restrict the first adjusting spring 154 from rotating with respect to the first pressure plate 39.

The first stoppers 151 are fixed to the first disc portion 33 of the first flywheel 3 for restricting the first pressure plate 39 from axially moving with respect to the first flywheel 3. Specifically, the first stopper 151 is inserted into the first slide bushing 152 while being disposed for axially making contact with the first slide bushing 152. In transmitting power, a clearance G1 is produced between the first stopper 151 and the first slide bushing 152. The clearance G1 corresponds to the lift amount of the first pressure plate 39 in clutch release. Therefore, even when the first friction part 57 is abraded, the lift amount of the first pressure plate 39 is kept constant by the first slide bushing 152 and the first stopper 151.

The first stopper 151 is disposed for restricting the first slide bushing 152 and the first pressure plate 39 from moving towards the transmission. The first stopper 151 has a stopper main body 151a and the stopper portion 151b. The stopper main body 151a is screwed into the first disc portion 33. The stopper portion 151b is formed in an end of the stopper main body 151a. The stopper portion 151b is an annular portion protruded radially outwards from the stopper main body 151a. The stopper portion 151b can make contact with the aforementioned first hooking portion 152d of the first slide bushing 152. The first stopper 151 is disposed concentrically to the first adjusting bolt 153 and the first slide bushing 152. Specifically, the center axis of the first stopper 151, that of the first adjusting bolt 153 and that of the first slide bushing 152 are matched with a line B1, as illustrated in FIG. 3.

<Second Abrasion Tracking Mechanisms 200>

Figure 7:
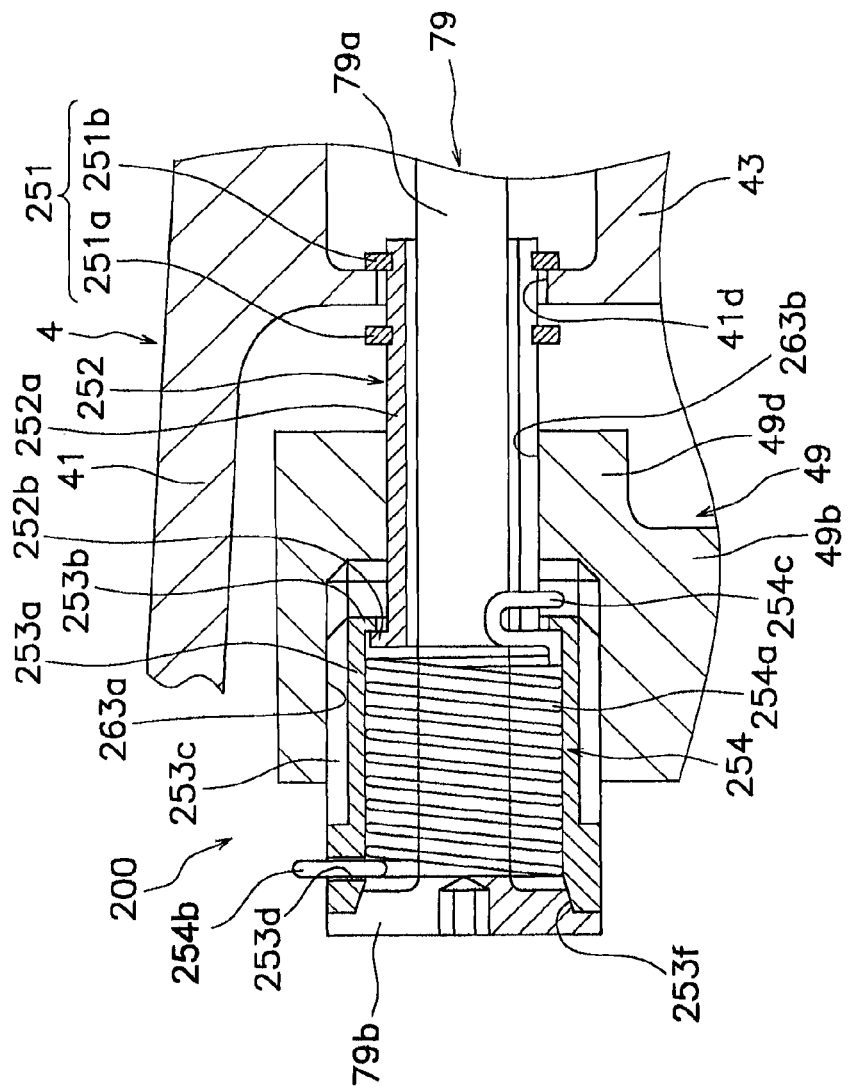
FIG. 7 is an enlarged cross-sectional view of the second abrasion tracking mechanism and its periphery.

The plural second abrasion tracking mechanisms 200 are mechanisms circumferentially aligned at equal intervals for inhibiting performance degradation of the clutch device 1 attributed to abrasion of the second friction part 67 of the second clutch C2. Each second abrasion tracking mechanism 200 is disposed between adjacent first abrasion tracking mechanisms 100. As illustrated in FIGS. 6 and 7, each second abrasion tracking mechanism 200 specifically includes a second adjusting bolt 253 (an exemplary first or second adjusting member), a second adjusting spring 254 (an exemplary first or second elastic member), the second slide bushing 252 (an exemplary first or second detecting member) and a second stopper 251 (an exemplary first or second stopper part).

The second adjusting bolt 253 is attached to the second pressure plate 49 while being disposed for transmitting pressing force of the second diaphragm spring 72 to the second pressure plate 49. Specifically, the second adjusting bolt 253 includes a second bolt main body 253a and a second contact portion 253b. The second bolt main body 253a, having a roughly tubular shape, includes a second screw portion 253c. The second contact portion 253b, having an annular shape, is protruded radially inwards from the second bolt main body 253a.

The second bolt main body 253a is screwed into the second screw hole 263a. Therefore, the second bolt main body 253a is configured to be axially moved with respect to the second pressure plate 49 when being rotated with respect to the second pressure plate 49. The second adjusting spring 254 always applies rotational force to the second bolt main body 253a. More specifically, the second adjusting spring 254 always applies rotational force to the second bolt main body 253a for allowing the second adjusting spring 254 to be moved towards the first disc portion 33 with respect to the second pressure plate 49. Further, the second bolt main body 253a has a second tapered surface 253f. The second tapered surface 253f makes contact with the cap portion 79b of the coupling rod 79.

The second contact portion 253b is a portion having an annular shape and axially makes contact with a second restricting portion 252b (to be described) of the second slide bushing 252. The second slide bushing 252 is inserted into the second contact portion 253b.

The second slide bushing 252 is a member for restricting the second adjusting bolt 253 from moving towards the engine. The second slide bushing 252 is supported by the second pressure plate 49 while being axially movable with respect to the second pressure plate 49. The second slide bushing 252 is protruded towards the transmission-side end from the second pressure plate 49. The engine-side end of the second slide bushing 252 is inserted into the second bolt main body 253a of the second adjusting bolt 253. The second slide bushing 252 is disposed concentrically to the second adjusting bolt 253.

The second slide bushing 252 includes a second slide bushing main body 252a having a roughly tubular shape and the second restricting portion 252b protruded radially outwards from the second slide bushing main body 252a in a roughly annular shape. The second slide bushing main body 252a is inserted into the second support hole 263b while the outer diameter thereof is reduced. Specifically, the second slide bushing main body 252a includes a second slit 252c having an axially elongated shape. The second slide bushing main body 252a is elastically deformable in the radial direction due to the second slit 252c formed therein. The second slide bushing main body 252a is tightly fitted into the second support hole 263b of the second pressure plate 49. Therefore, relatively large slide resistance is generated between the second slide bushing 252 and the second pressure plate 49 when the second slide bushing 252 is either rotated or axially moved with respect to the second pressure plate 49. Because of this, the second slide bushing 252 is basically moved unitarily with the second pressure plate 49 in the axial direction. When relatively large axial force acts on the second slide bushing 252, however, the second slide bushing 252 is axially moved with respect to the second pressure plate 49.

The second restricting portion 252b is disposed inside the second bolt main body 253a, while being disposed on the first disc portion 33 side of the second contact portion 253b. The second restricting portion 252b axially makes contact with the second contact portion 253b. The second slit 252c is extended to the second restricting portion 252b. Therefore, the second restricting portion 252b is formed in a C-shape. A second end 254c (to be described) of the second adjusting spring 254 is inserted into the second slit 252c.

The second adjusting spring 254 is a torsion coil spring for applying rotational force to the second adjusting bolt 253. The second adjusting spring 254 applies rotational force to the second adjusting bolt 253 for allowing the second adjusting bolt 253 to be moved towards the transmission (i.e., towards the second disc portion 43) with respect to the second pressure plate 49.

Specifically, the second adjusting spring 254 has a second spring main body 254a, a first end 254b and the second end 254c. The second spring main body 254a is a portion for generating rotational force and is disposed in the inner peripheral side of the second adjusting bolt 253. The first end 254b is protruded from the engine-side end of the second spring main body 254a while being hooked on the second adjusting bolt 253.

For example, the first end 254b is inserted into a second hooking hole 253d of the second adjusting bolt 253. The second end 254c is protruded from the second slide bushing 252 side end of the second spring main body 254a while being hooked on the second slide bushing 252. For example, the second end 254c is inserted into the second slit 252c of the second slide bushing 252. The second slide bushing 252 is tightly fitted into the second support hole 263b. Therefore, relatively large slide resistance is generated between the second slide bushing 252 and the second pressure plate 49 when the second slide bushing 252 is either rotated or axially moved with respect to the second pressure plate 49. Rotational force, applied to the second adjusting bolt 253 from the second adjusting spring 254, is not large enough to rotate the second slide bushing 252. Therefore, the second slide bushing 252 can restrict the second adjusting spring 254 from rotating with respect to the second pressure plate 49.

The second stopper 251 is fixed to the second slide bushing 252 for restricting the second pressure plate 49 from axially moving with respect to the second flywheel 4. Specifically, the second stopper 251 includes a first restricting ring 251a and a second restricting ring 251b. The first restricting ring 251a and the second restricting ring 251b are so-called snap rings and are attached to the second slide bushing 252. The first restricting ring 251a is disposed on the engine side (i.e., the second pressure plate 49 side) of the second disc portion 43, whereas the second restricting ring 251b is disposed on the transmission side of the second disc portion 43. In transmitting power, a clearance G2 is produced between the second restricting ring 251b and the second disc portion 43. The clearance G2 corresponds to the lift amount of the second pressure plate 49 in clutch release. Therefore, when the second friction part 67 is abraded, the first restricting ring 251a makes contact with the second disc portion 43 for axially moving the second slide bushing 252 with respect to the second pressure plate 49. As a result, the clearance G2 is always kept constant. Therefore, the lift amount of the second pressure plate 49 is kept constant by the second disc portion 43 and the second stoppers 251.

The second slide bushing 252, the second adjusting bolt 253 and the coupling rod 79 are concentrically disposed. Specifically, the center axis of the second slide bushing 252, that of the second adjusting bolt 253 and that of the coupling rod 79 are matched with a line B2, as illustrated in FIG. 4.

<Basic Actions of Clutch Device 1>

Basic actions of the clutch device 1 will be explained. In the state illustrated in FIGS. 1 to 3, pressing force is not applied to the first and second clutches C1 and C2 by the drive mechanism 7 while power transmission is not executed in the first and second clutches C1 and C2. In the state, the first pressure plate 39 is held by the first strap plates (not illustrated in the figures) in the axial position illustrated in FIGS. 1 to 3, while the second pressure plate 49 is held by the second strap plates (not illustrated in the figures) in the axial position illustrated in FIGS. 1 to 3. When power is transmitted from the engine to the input rotor 10, the input rotor 10, the first pressure plate 39, the second pressure plate 49 and the drive mechanism 7 are unitarily rotated. The first input shaft 91 supports the first bearing 34 through the support member 35, while the first bearing 34 supports the first flywheel 3 in a rotatable state. On the other hand, the second input shaft 92 supports the second bearing 44, while the second bearing 44 supports the second flywheel 4 in a rotatable state. With the structure, the input rotor 10 is stably rotated.

For example, when the vehicle starts moving at the first speed, the first input shaft 91 side of the transmission is switched into the first speed and a first drive bearing 76 of the first drive mechanism 7A is pressed towards the engine by means of a first actuator (not illustrated in the figures). As a result, the first diaphragm spring 71 is elastically deformed while being pressed on the first protrusion 75a as a fulcrum. The second support plate 73 is thereby pressed towards the engine. When the second support plate 73 is pressed through the first diaphragm spring 71, the intermediate members 78 and the first pressure plate 39 are moved towards the engine. As a result, the first friction part 57 of the first clutch disc assembly 5 is interposed and held between the first pressure plate 39 and the first flywheel 3 (more specifically, the first disc portion 33), and power is transmitted to the first input shaft 91 through the first clutch disc assembly 5. With the actions, the vehicle starts moving at the first speed.

In shifting the speed stage from the first speed to the second speed, the second input shaft 92 side of the transmission is switched into the second speed. The second clutch C2 is switched into the coupled state roughly simultaneously with decoupling of the first clutch C1 while the transmission is set to be in the second speed.

Specifically, pressing load acting on the first drive mechanism 7A is released and the first drive bearing 76 is returned to the transmission side. As a result, the first diaphragm spring 71 is returned to the state illustrated in FIGS. 1 to 3, and power transmission through the first clutch C1 is released.

On the other hand, a second drive bearing 77 of the second drive mechanism 7B is pressed towards the engine by means of a second actuator (not illustrated in the figures). As a result, the second diaphragm spring 72 is elastically deformed while being pressed on the support protruding portion 43a as a fulcrum, and the third support plate 74 is pulled towards the transmission. When the third support plate 74 is pressed by the second diaphragm spring 72, the coupling rods 79 and the second pressure plate 49 are moved towards the transmission. As a result, the second friction part 67 of the second clutch disc assembly 6 is interposed and held between the second pressure plate 49 and the second flywheel 4 (more specifically, the second disc portion 43), and power is transmitted to the second input shaft 92 through the second clutch disc assembly 6. With the actions, the speed stage is switched from the first speed to the second speed.

<Actions of First Abrasion Tracking Mechanisms 100>

Figure 8:
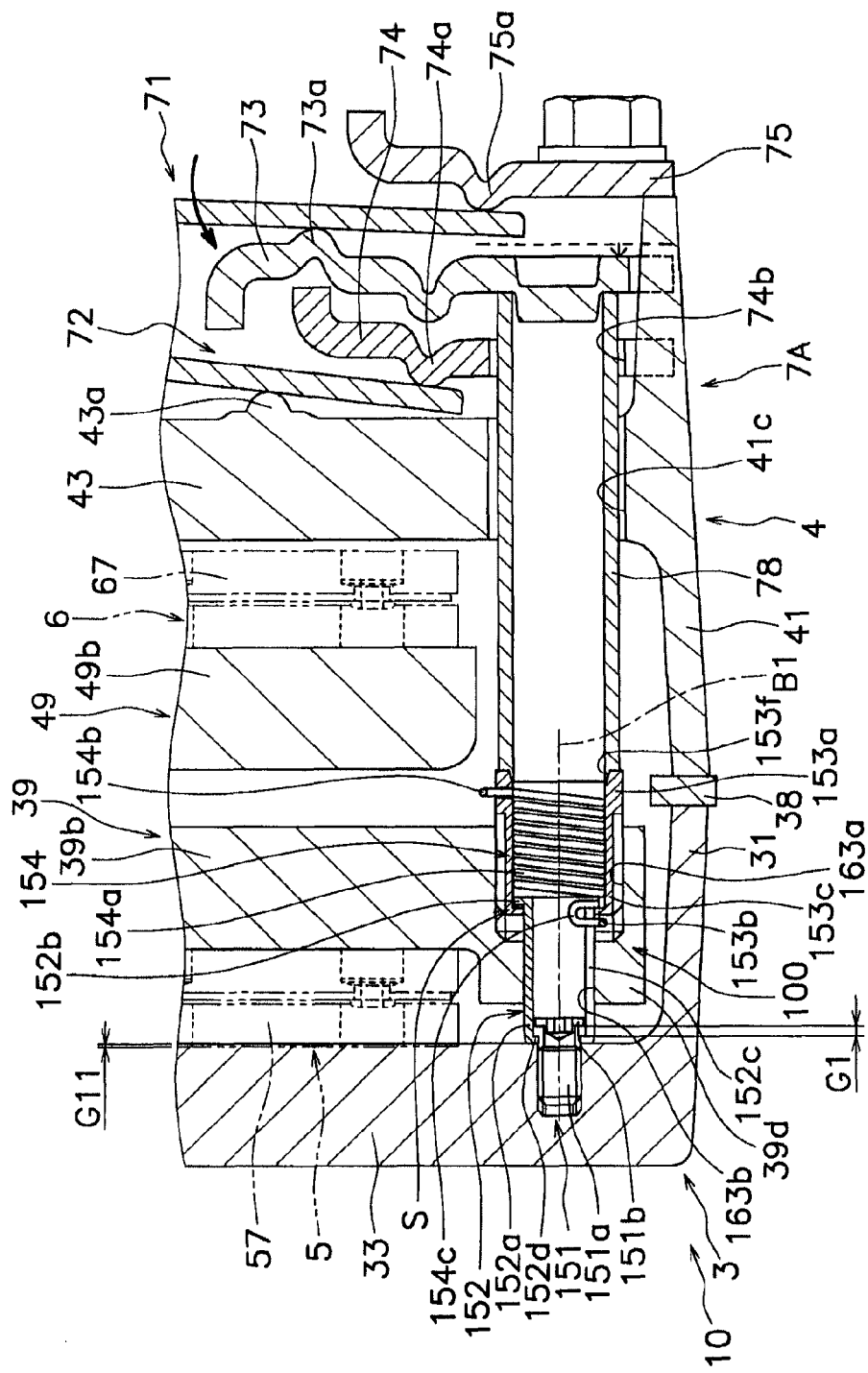
FIG. 8 is a diagram for explaining actions of the first abrasion tracking mechanism (when a first clutch is coupled).

When the first pressure plate 39 is pressed towards the engine by the first drive mechanism 7A in the coupled state of the first clutch C1, the first slide bushings 152 make contact with the first disc portion 33 of the first flywheel 3 as illustrated in FIG. 8. When the first friction part 57 is abraded, the first pressure plate 39 is pressed towards the engine side by the first drive mechanism 7A after the first slide bushings 152 make contact with the first disc portion 33. Slide resistance generated between the first slide bushings 152 and the first pressure plate 39 is herein remarkably less than pressing load to be applied to the first pressure plate 39 by the first drive mechanism 7A. Therefore, the first slide bushings 152 slide with the first pressure plate 39, and as illustrated in FIG. 8, the first pressure plate 39 is moved towards the engine with respect to the first slide bushings 152. When the first friction part 57 is completely interposed and held between the first pressure plate 39 and the first disc portion 33, the first pressure plate 39 is stopped moving. Thus, power transmission is executed through the first clutch disc assembly 5. Under the condition, a clearance corresponding to an abrasion amount G11 of the first friction part 57 is produced between the first restricting portions 152b and the first contact portions 153b.

When application of pressing load by the first drive mechanism 7A is released for releasing the coupled state of the first clutch C1, the first pressure plate 39 is moved towards the transmission with respect to the first flywheel 3 by means of elastic force of the first strap plates. However, the first pressure plate 39 is stopped moving towards the transmission with respect to the first flywheel 3 when the first hooking portions 152d of the first slide bushings 152 make contact with the stopper portions 151b of the first stoppers 151. When the releasing action is further continued thereafter, the first diaphragm spring 71 is separated away from the second support plate 73. Therefore, the pressing load applied to the first adjusting bolts 153 becomes roughly zero. The rotational force of the first adjusting springs 154 always acts on the first adjusting bolts 153. Therefore, the first adjusting bolts 153 are rotated until the clearance G1 is eliminated between the first contact portions 152b of the first slide bushings 152 and the first stopper parts 153d of the first adjusting bolts 153. In this way, the abrasion tracking action to be executed in accordance with abrasion of the first friction part 57 is completed.

When the first adjusting bolts 153 are moved with respect to the first pressure plate 39, the first contact portions 153b of the first adjusting bolts 153 make contact with the first restricting portions 152b. Axial slide resistance generated between the first slide bushings 152 and the first support holes 163b of the first pressure plate 39 is herein remarkably greater than axial force of the first adjusting bolts 153 generated by the rotational force of the first adjusting springs 154. Therefore, when the first contact portions 153b of the first adjusting bolts 153 make contact with the first restricting portions 152b of the first slide bushings 152, the first slide bushings 152 restrict the first adjusting bolts 153 from axially moving without moving with respect to the first pressure plate 39 and the first adjusting bolts 153 are stopped rotating.

Further, rotation-directional slide resistance generated between the first slide bushings 152 and the first support holes 163b of the first pressure plate 39 is also remarkably greater than rotational force of the first adjusting springs 154. Therefore, a situation is not also caused that the first slide bushings 152 are unexpectedly rotated and the rotational force of the first adjusting springs 154 is thereby loosened. Yet further, a situation is not also caused that the first adjusting bolts 153 are unexpectedly rotated even when the first diaphragm spring 71 is intermittently separated away from the second support plate 73 by the axial vibration of the first pressure plate 39 that tends to be generated in clutch releasing due to the action as described above.

Figure 9:
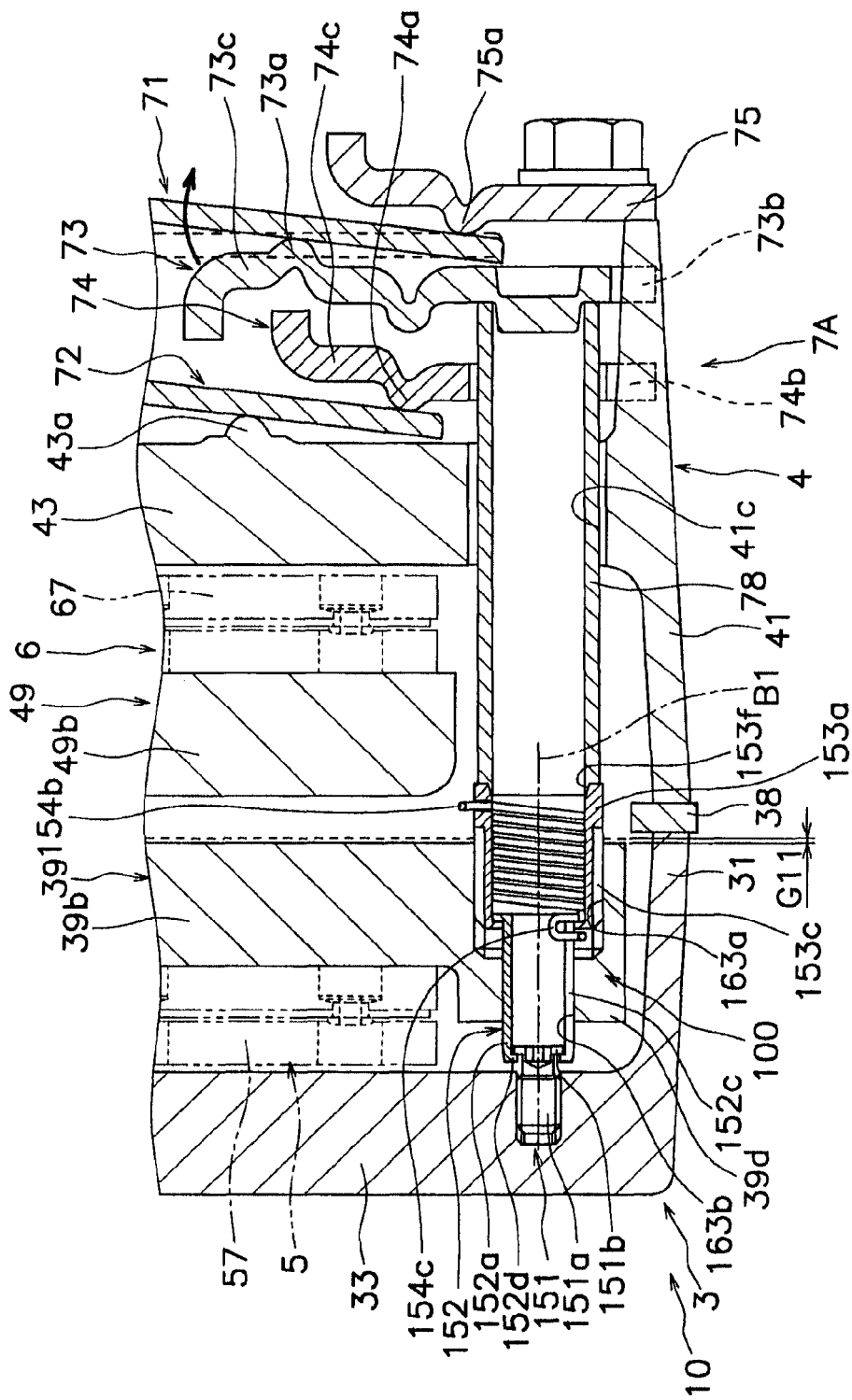
FIG. 9 is a diagram for explaining actions of the first abrasion tracking mechanism (when the first clutch is decoupled).

Thus, the first slide bushings 152 and the first adjusting bolts 153 are moved towards the transmission with respect to the first pressure plate 39 by the amount corresponding to the abrasion amount G11 of the first friction part 57 as illustrated in FIG. 9. In response, the second support plate 73 is moved towards the transmission with respect to the first pressure plate 39. In other words, the first pressure plate 39 is moved towards the engine with respect to the first slide bushings 152 and the first adjusting bolts 153 by the amount corresponding to the abrasion amount G11 of the first friction part 57. When the first friction part 57 is abraded, the aforementioned actions are repeated in releasing the coupled state of the first clutch C1.

As described above, according to the first abrasion tracking mechanisms 100, the fulcrum position where the first diaphragm spring 71 and the second support plate 73 make contact with each other is kept roughly constant even when the first friction part 57 is abraded. A feed screw structure is herein utilized. Therefore, once adjustment is completed, a situation is not also caused that the first adjusting bolts 153 are turned back by the pressing load of the first diaphragm spring 71. Further, there is no chance that the first adjusting bolts 153 are excessively turned by vibration and etc. and so-called over adjustment occurs. Therefore, it is possible to effectively inhibit variation in performance of the clutch device 1 attributed to abrasion of the first friction part 57.

Further, the first slide bushings 152, configured to detect the abrasion amount, restrict movement of the first adjusting bolts 153. Therefore, it is possible to integrate a mechanism for adjusting the fulcrum position and a mechanism for detecting the abrasion amount into a single mechanism. In other words, according to the clutch device 1, the first abrasion tracking mechanisms 100 can be compactly formed, and further, simplification of an assembling method and reduction in manufacturing cost can be achieved.

Yet further, the first adjusting bolt 153 is disposed within the first screw hole 163a, while the first adjusting spring 154 is disposed in the inner peripheral side of the first adjusting bolt 153. Therefore, each first abrasion tracking mechanism 100 can be partially disposed in the inside of the first pressure plate 39. Accordingly, the installation space of each first abrasion tracking mechanism 100 can be reduced.

<Actions of Second Abrasion Tracking Mechanisms 200>

Figure 10:
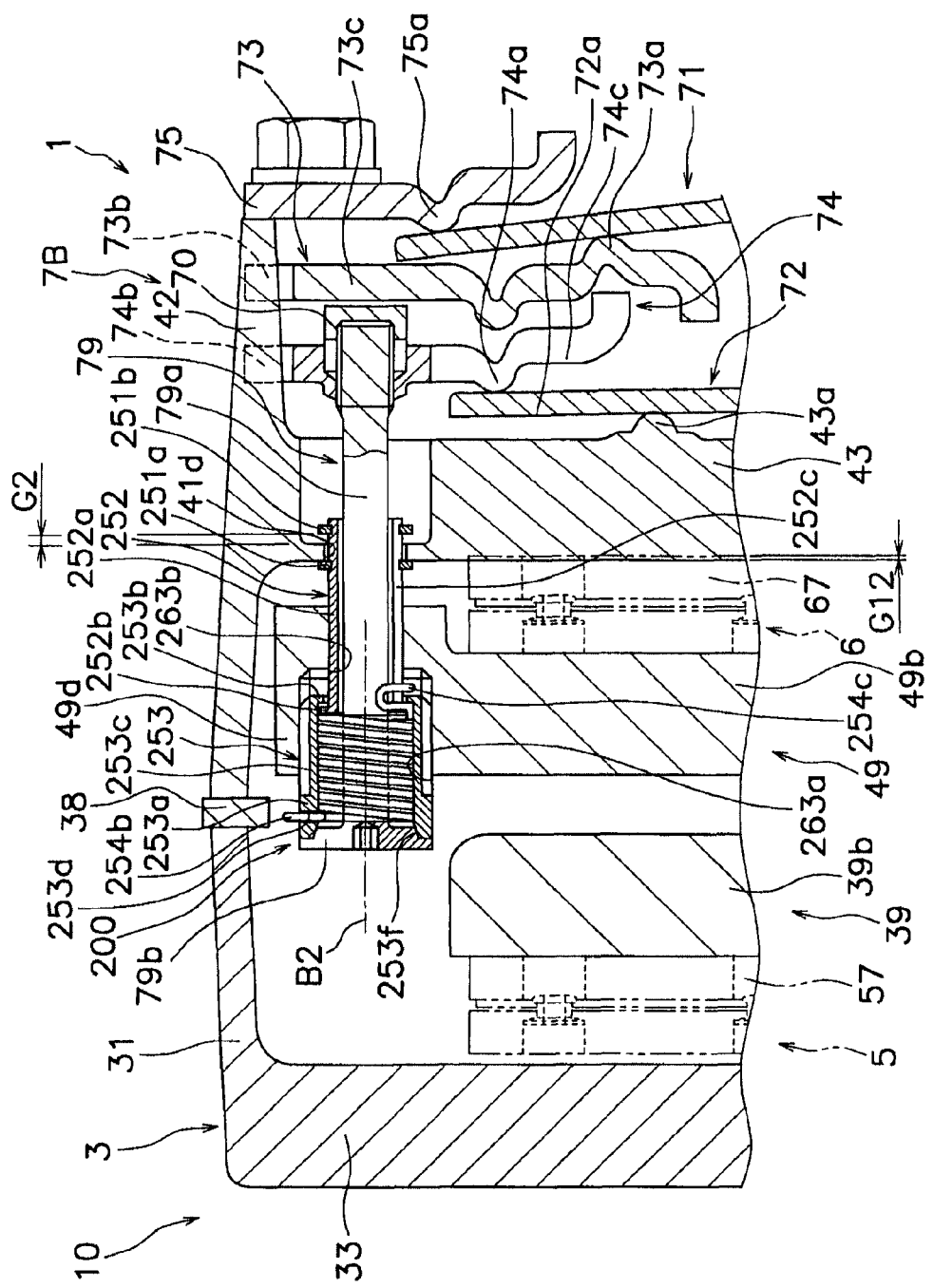
FIG. 10 is a diagram for explaining actions of the second abrasion tracking mechanism (when a second clutch is coupled).

When the second pressure plate 49 is pressed towards the transmission by the second drive mechanism 7B in the coupled of the second clutch C2, the first restricting rings 251a attached to the second slide bushings 252 make contact with the second disc portion 43 of the second flywheel 4 as illustrated in FIG. 10. When the second friction part 67 is abraded, the second pressure plate 49 is pressed towards the transmission by the second drive mechanism 7B after the first restricting rings 251a thus make contact with the second disc portion 43. Slide resistance generated between the second slide bushings 252 and the second pressure plate 49 is herein remarkably less than pressing load to be applied to the second pressure plate 49 by the second drive mechanism 7B. Therefore, the second slide bushings 252 slide with the second pressure plate 49, and as illustrated in FIG. 10, the second pressure plate 49 is moved towards the transmission with respect to the second slide bushings 252. When the second friction part 67 is completely interposed and held between the second pressure plate 49 and the second disc portion 43, the second pressure plate 49 is stopped moving. Thus, power transmission is executed through the second clutch disc assembly 6. Under the condition, a clearance corresponding to an abrasion amount G12 of the second friction part 67 is produced between the second restricting portions 252b and the second contact portions 253b.

When application of pressing load by the second drive mechanism 7B is released for releasing the coupled state of the second clutch C2, the second pressure plate 49 is moved towards the engine with respect to the second flywheel 4 by means of elastic force of the second strap plates. However, the second pressure plate 49 is stopped moving towards the engine with respect to the second flywheel 4 when the second restricting rings 251b of the second stoppers 251 fixed to the second slide bushings 252 make contact with the second through holes 41d of the second flywheel 4. When the releasing action is further continued thereafter, the second diaphragm spring 72 is separated away from the third support plate 74. Therefore, the pressing load applied to the second adjusting bolts 253 becomes roughly zero. The rotational force of the second adjusting springs 254 always acts on the second adjusting bolts 253. Therefore, the second adjusting bolts 253 are rotated until the clearance G12 is eliminated between the second restricting portions 252b of the second slide bushings 252 and the second contact portions 253b of the second adjusting bolts 253. In this way, the abrasion tracking action to be executed in accordance with abrasion of the second friction part 67 is completed.

When the second adjusting bolts 253 are moved with respect to the second pressure plate 49, the second contact portions 253b of the second adjusting bolts 253 make contact with the second restricting portions 252b. Axial slide resistance generated between the second slide bushings 252 and the second support holes 263b of the second pressure plate 49 is herein remarkably greater than axial force of the second adjusting bolts 253 generated by the rotational force of the second adjusting springs 254. Therefore, when the second contact portions 253b of the second adjusting bolts 253 make contact with the second restricting portions 252b of the second slide bushings 252, the second slide bushings 252 restrict the second adjusting bolts 253 from axially moving without moving with respect to the second pressure plate 49 and the second adjusting bolts 253 are stopped rotating.

Further, rotation-directional slide resistance generated between the second slide bushings 252 and the second support holes 263b of the second pressure plate 49 is also remarkably greater than rotational force of the second adjusting springs 254. Therefore, a situation is not also caused that the second slide bushings 252 are unexpectedly rotated and the rotational force of the second adjusting springs 254 is thereby loosened. Yet further, a situation is not also caused that the second adjusting bolts 253 are unexpectedly rotated even when the second diaphragm spring 72 is intermittently separated away from the third support plate 73 by the axial vibration of the second pressure plate 49 that tends to be generated in clutch release due to the action as described above.

Figure 11:
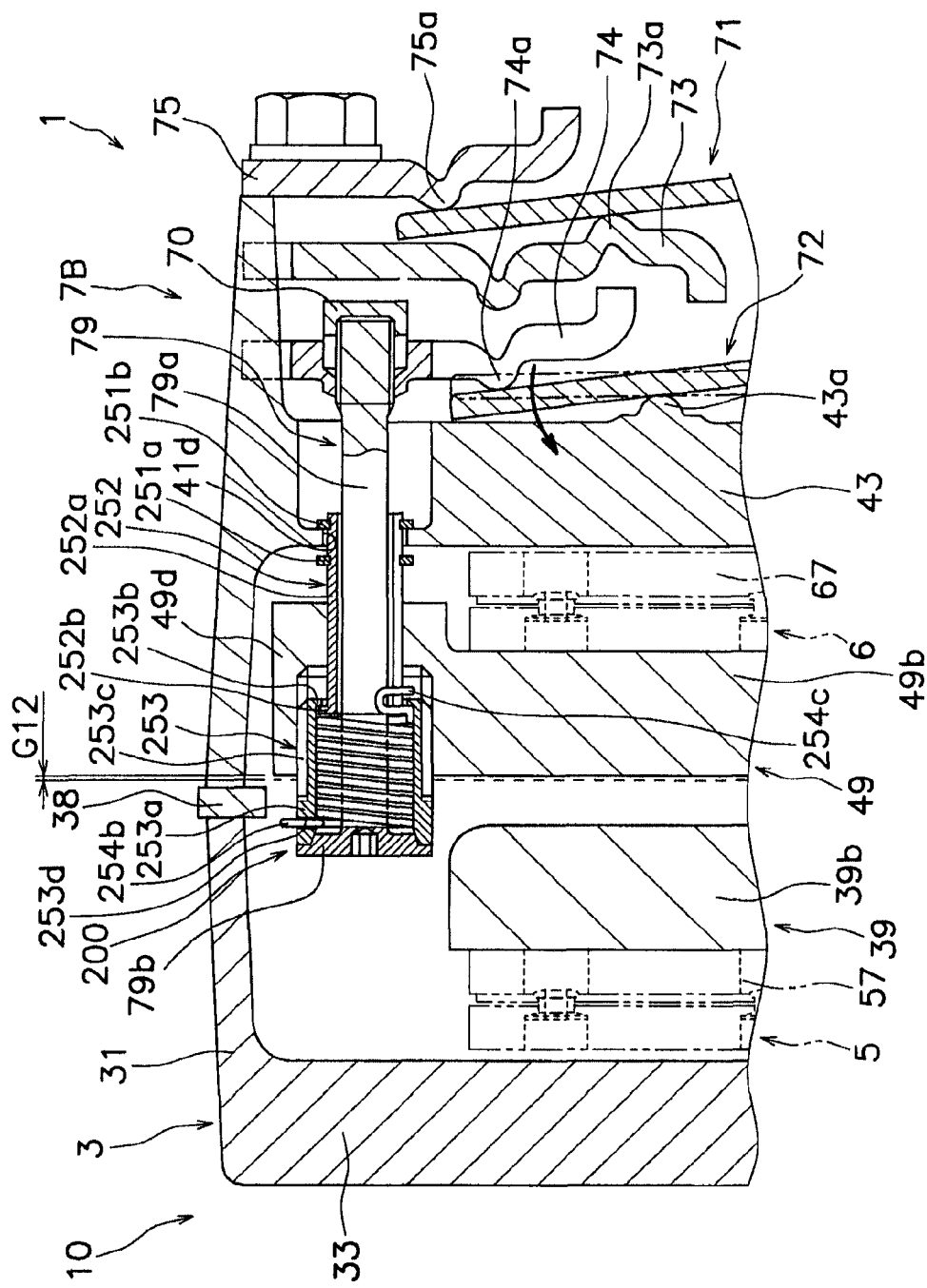
FIG. 11 is a diagram for explaining actions of the second abrasion tracking mechanism (when the second clutch is decoupled).

Thus, the coupling rods 79, the second slide bushings 252 and the second adjusting bolts 253 are moved towards the transmission with respect to the second pressure plate 49 by the amount corresponding to the abrasion amount G12 of the second friction part 67 as illustrated in FIG. 11. In response, the third support plate 74 is moved towards the transmission with respect to the second pressure plate 49. In other words, the second pressure plate 49 is moved towards the engine with respect to the second slide bushings 252 and the second adjusting bolts 253 by the amount corresponding to the abrasion amount G12 of the second friction part 67. When the second friction part 67 is abraded, the aforementioned actions are repeated in releasing the coupled state of the second clutch C2.

As described above, according to the second abrasion tracking mechanisms 200, the fulcrum position where the second diaphragm spring 72 and the third support plate 74 make contact with each other is kept roughly constant even when the second friction part 67 is abraded. A feed screw structure is herein utilized. Therefore, once adjustment is completed, a situation is not also caused that the second adjusting bolts 253 are turned back by the pressing load of the second diaphragm spring 72. Further, there is no chance that the second adjusting bolts 253 are excessively turned by vibration and etc. and so-called over adjustment occurs. Therefore, it is possible to effectively inhibit variation in performance of the clutch device 1 attributed to abrasion of the second friction part 67.

Further, the second slide bushings 252, configured to detect the abrasion amount, restrict movement of the second adjusting bolts 253. Therefore, it is possible to integrate a mechanism for adjusting the fulcrum position and a mechanism for detecting the abrasion amount into a single mechanism. In other words, according to the clutch device 1, the second abrasion tracking mechanisms 200 can be compactly formed, and further, simplification of an assembling method and reduction in manufacturing cost can be achieved.

Yet further, the second adjusting bolt 253 is disposed within the second screw hole 263a, while the second adjusting spring 254 is disposed in the inner peripheral side of the second adjusting bolt 253. Therefore, each second abrasion tracking mechanism 200 can be partially disposed in the inside of the second pressure plate 49. Accordingly, the installation space of each second abrasion tracking mechanism 200 can be reduced.

<Other Exemplary Embodiments>

The present invention is not limited to the aforementioned exemplary embodiment. A variety of changes or modifications can be herein made without departing from the scope of the present invention. It should be noted that the same reference numerals are assigned to elements having substantially the same functions as those in the aforementioned exemplary embodiment and detailed explanation thereof will be hereinafter omitted.

(1) The aforementioned first and second abrasion tracking mechanisms 100 and 200 are mounted on the clutch device 1. However, the device embedded with such abrasion tracking mechanisms is not limited to the clutch device 1 according to the aforementioned exemplary embodiment. The abrasion tracking mechanisms can be applied to any other clutch devices as long as the clutch devices serve to transmit power from the engine to the first and second input shafts of the transmission.

For example, the first pressure plate 39, the second pressure plate 49, the first clutch disc assembly 5 and the second clutch disc assembly 6 are disposed in the inside of the input rotor 10. However, the present invention can be applied to a clutch device of so-called a center plate type that a member onto which the first and second friction parts 57 and 67 are pressed is disposed between the first clutch disc assembly 5 and the second clutch disc assembly 6.

Further, in the aforementioned exemplary embodiment, the damper mechanisms are disposed in the first clutch disc assembly 5 and the second clutch disc assembly 6. However, a damper mechanism is disposed between the engine and the input rotor 10.

Further, it is possible to achieve advantageous effects similarly to those achieved in the aforementioned exemplary embodiment as long as at least either of the first abrasion tracking mechanisms 100 and the second abrasion tracking mechanisms 200 are disposed in the clutch device.

(2) In the aforementioned exemplary embodiment, the first slide bushing 152 and the first adjusting spring 154 are disposed in the inner peripheral side of the first adjusting bolt 153. However, arrangement of the first slide bushing 152 and the first adjusting spring 154 is not limited to the aforementioned arrangement. For example, the first slide bushing 152 and the first adjusting spring 154 may be disposed outside the first adjusting bolt 153.

Further, in the aforementioned exemplary embodiment, the second slide bushing 252 and the second adjusting spring 254 are disposed in the inner peripheral side of the second adjusting bolt 253. However, arrangement of the second slide bushing 252 and the second adjusting spring 254 are not limited to the aforementioned arrangement. For example, the second slide bushing 252 and the second adjusting spring 254 may be disposed outside the second adjusting bolt 253.

(3) In the aforementioned exemplary embodiment, the second end of the first elastic member (i.e., the second end 154c of the first adjusting spring 154) is hooked on the first detecting member (i.e., the first slide bushing 152). However, the second end 154c of the first adjusting spring 154 may be hooked on a member fixed to the first slide bushing 152, for instance. In other words, the first detecting member includes not only the first slide bushing 152 but also the member fixed to the first slide bushing 152.

Further, in the aforementioned exemplary embodiment, the second end of the second elastic member (i.e., the second end 254c of the second adjusting spring 254) is hooked on the second detecting member (i.e., the second slide bushing 252). However, the second end 254c of the second adjusting spring 254 may be hooked on a member fixed to the second slide bushing 252, for instance. In other words, the second detecting member includes not only the second slide bushing 252 but also the member fixed to the second slide bushing 252.

INDUSTRIAL APPLICABILITY

According to the clutch device of the present invention, it is possible to inhibit performance variation attributed to abrasion. Therefore, the present invention is useful in the field of clutch devices.

The invention claimed is:

1. A clutch device for transmitting power from an engine to a first input shaft and a second input shaft of a transmission, the clutch device comprising:
   an input rotor configured to receive power transmitted thereto from the engine;
   a first pressure plate axially movable and unitarily rotatable with the input rotor;
   a second pressure plate axially movable and unitarily rotatable with the input rotor;
   a first clutch disc assembly configured to be coupled to the first input shaft, the first clutch disc assembly being disposed between the input rotor and the first pressure plate;
   a second clutch disc assembly configured to be coupled to the second input shaft, the second clutch disc assembly being disposed between the input rotor and the second pressure plate;
   a first drive member configured to axially press the first pressure plate;
   a second drive member configured to axially press the second pressure plate;
   a first adjusting member configured to transmit pressing force of the first drive member to the first pressure plate, the first adjusting member being configured to be axially moved with respect to the first pressure plate when rotated with respect to the first pressure plate;
   a first elastic member configured to apply rotational force to the first adjusting member; and
   a first detecting member supported by the first pressure plate while being axially movable with respect to the first pressure plate in accordance with abrasion of the first clutch disc assembly, the first detecting member being configured to restrict the first pressure plate from moving towards the second clutch disc assembly, the first detecting member being configured to contact the first adjusting member.

2. The clutch device recited in claim 1, wherein
   the first elastic member includes a first main body being configured to generate rotational force, a first end, and a second end,
   the first end of the first elastic member is hooked on the first adjusting member, and
   the second end of the first elastic member is hooked on at least one of the first detecting member and the first pressure plate.

3. The clutch device recited in claim 1, wherein
   the first detecting member is disposed to make contact with the input rotor in clutch engagement, and
   the first detecting member is disposed to move with respect to the first pressure plate when the first clutch disc assembly is abraded.

4. The clutch device recited in claim 1, wherein
   the first detecting member is disposed roughly concentrically to the first adjusting member.

5. The clutch device recited in claim 1, wherein
   the first adjusting member includes
      a first adjusting member main body having a roughly tubular shape, and
      a first contact portion radially protruding from the first adjusting member main body, and
   the first detecting member includes
      a first detecting member main body having a roughly tubular shape, and
      a first restricting portion radially protruding from the first detecting member main body,
   the first restricting portion being configured to axially make contact with the first contact portion.

6. The clutch device recited in claim 5, wherein
   the first contact portion protrudes radially inwards from the first adjusting member main body, and
   the first restricting portion protrudes radially outwards from the first detecting member main body.

7. The clutch device recited in claim 6, wherein
   the first detecting member is partially inserted into the first adjusting member.

8. The clutch device recited in claim 7, wherein
   the first contact portion is roughly annular,
   the first detecting member main body is partially inserted into the first contact portion,
   the first restricting portion is disposed inwards of the first adjusting member main body, and
   the first restricting portion is disposed on an opposite side of the first clutch disc assembly through the first contact portion.

9. The clutch device recited in claim 1, further comprising
   a first stopper part being fixed to the input rotor to restrict the first pressure plate from axially moving with respect to the input rotor, wherein
   the first stopper part is disposed roughly concentrically to the first detecting member.

10. The clutch device recited in claim 9, wherein
    the first stopper part is inserted into the first detecting member.

11. The clutch device recited in 9, wherein
    the first stopper part is disposed while being allowed to axially make contact with the first detecting member.

12. The clutch device recited in claim 1, further comprising
    a second adjusting member being disposed to transmit pressing force of the second drive member to the second pressure plate, the second adjusting member being configured to be axially moved with respect to the second pressure plate when rotated with respect to the second pressure plate,
    a second elastic member being configured to apply rotational force to the second adjusting member, and
    a second detecting member being supported by the second pressure plate while being axially movable with respect to the second pressure plate in accordance with abrasion of the second clutch disc assembly, the second detecting member being disposed to restrict the second pressure plate from moving towards the first clutch disc assembly.

13. The clutch device recited in claim 12, wherein
    the second detecting member is configured to axially make contact with the second adjusting member.

14. The clutch device recited in claim 12, wherein
    the second detecting member is disposed to make contact with the input rotor in clutch engagement, and
    the second detecting member is disposed to move axially with respect to the second pressure plate when the second clutch disc assembly is abraded.

15. The clutch device recited in claim 12, wherein
    the second detecting member is disposed roughly concentrically to the second adjusting member.

16. The clutch device recited in claim 12, wherein
    the second adjusting member includes a second screw portion formed on an outer peripheral part thereof, and
    the second pressure plate includes a second screw hole allowing the second screw portion of the adjusting member to be screwed therein.

17. The clutch device recited in claim 16, wherein
the second pressure plate includes a second support hole allowing the second detecting member to be tightly fitted therein, and
the second support hole is continued to the second screw hole.

18. The clutch device recited in claim 12, wherein
the second elastic member includes a second main body generating rotational force, a first end, and a second end,
the first end of the second elastic member is hooked on the second adjusting member, and
the second end of the second elastic member is hooked on at least one of the second detecting member and the second pressure plate.

19. The clutch device recited in claim 18, wherein
the first pressure plate includes a first support hole allowing the first detecting member to be tightly fitted therein, and
the first support hole is continued to the first screw hole.

20. The clutch device recited in claim 12, wherein
the second adjusting member includes
    a second adjusting member main body having a roughly tubular shape, and
    a second contact portion radially protruding from the second adjusting member main body, and
the second detecting member includes
    a second detecting member main body having a roughly tubular shape, and
    a second restricting portion radially protruding from the second detecting member,
the second restricting portion being disposed to axially make contact with the second contact portion.

21. The clutch device recited in claim 20, wherein
the second contact portion protrudes radially inwards from the second adjusting member main body, and
the second restricting portion protrudes radially outwards from the second detecting member main body.

22. The clutch device recited in claim 21, wherein
the second detecting member is partially inserted into the second adjusting member.

23. The clutch device recited in claim 22, wherein
the second contact portion is roughly annular,
the second detecting member main body is partially inserted into the second contact portion,
the second restricting portion is disposed inwards of the second adjusting member main body, and
the second restricting portion is disposed on an opposite side of the second clutch disc assembly through the second contact portion.

24. The clutch device recited in claim 12, further comprising
a second stopper part being fixed to the second detecting member to restrict the second pressure plate from axially moving with respect to the input rotor, wherein
the second stopper part is disposed roughly concentrically to the second detecting member.

25. The clutch device recited in claim 24, wherein
the second stopper part is fixed to the second detecting member.

26. The clutch device recited in claim 24, wherein
the second stopper part is disposed to axially make contact with the second pressure plate.

27. A clutch device for transmitting power from an engine to a first input shaft and a second input shaft of a transmission, the clutch device comprising:
    an input rotor configured to receive power transmitted thereto from the engine;
    a first pressure plate axially movable and unitarily rotatable with the input rotor;
    a second pressure plate axially movable and unitarily rotatable with the input rotor;
    a first clutch disc assembly configured to be coupled to the first input shaft, the first clutch disc assembly being disposed between the input rotor and the first pressure plate;
    a second clutch disc assembly configured to be coupled to the second input shaft, the second clutch disc assembly being disposed between the input rotor and the second pressure plate;
    a first drive member configured to axially press the first pressure plate;
    a second drive member configured to axially press the second pressure plate;
    a first adjusting member configured to transmit pressing force of the first drive member to the first pressure plate, the first adjusting member being configured to be axially moved with respect to the first pressure plate when rotated with respect to the first pressure plate, the first adjusting member including a first screw portion formed on an outer peripheral part thereof;
    a first elastic member configured to apply rotational force to the first adjusting member; and
    a first detecting member supported by the first pressure plate while being axially movable with respect to the first pressure plate in accordance with abrasion of the first clutch disc assembly, the first detecting member being configured to restrict the first pressure plate from moving towards the second clutch disc assembly,
the first pressure plate including a first screw hole allowing the first screw portion of the adjusting member to be screwed therein.

* * * * *